United States Patent [19]

Hilsum et al.

[11] Patent Number: 4,468,137

[45] Date of Patent: Aug. 28, 1984

[54] TEMPERATURE INDICATING DEVICES

[75] Inventors: Cyril Hilsum; Damien G. McDonnell, both of Malvern, England

[73] Assignee: National Research Development Corporation, London, England

[21] Appl. No.: 308,790

[22] Filed: Oct. 5, 1981

[30] Foreign Application Priority Data

Oct. 7, 1980 [GB] United Kingdom ............... 8032280
Jun. 30, 1981 [GB] United Kingdom ............... 8120215

[51] Int. Cl.³ .................... C09K 3/34; G01K 11/12
[52] U.S. Cl. ............................ 374/160; 252/299.01; 252/299.7; 252/299.6; 252/299.66; 374/161; 374/162
[58] Field of Search ............... 374/160, 161, 162; 252/299.01, 299.63, 299.66, 299.7

[56] References Cited

U.S. PATENT DOCUMENTS

| | | | |
|---|---|---|---|
| 3,947,375 | 3/1976 | Gray et al. | 252/299.66 |
| 4,077,260 | 3/1978 | Gray et al. | 252/299.66 |
| 4,139,273 | 2/1979 | Crossland | 252/299.66 X |
| 4,154,697 | 5/1979 | Eidenschink et al. | 252/299.63 |
| 4,227,778 | 10/1980 | Raynes | 252/299.7 |
| 4,257,911 | 3/1981 | Gray et al. | 252/299.66 |
| 4,296,631 | 10/1981 | Fergason | 252/299.7 X |
| 4,385,844 | 5/1983 | Fergason | 252/299.7 |

OTHER PUBLICATIONS

Gray & McDonnell, Synthesis & Liquid Crystal Properties . . . , Mol. Cryst. Liq. Cryst., 1976, vol. 37, pp. 189-211.

*Primary Examiner*—Teddy S. Gron
*Assistant Examiner*—Catherine S. Kilby
*Attorney, Agent, or Firm*—Cushman, Darby & Cushman

[57] ABSTRACT

A temperature indicating device comprising a series of liquid crystal cells each of which contains a liquid crystal material having a different composition, the composition varying from cell-to-cell, and each of which cells exhibits the grandjean state whereby temperature is indicated by iridescence of the cells, the cells being such that the liquid crystal material in each has a clearing point at a different selected temperature in a series of temperature in a temperature range of interest and that each of the cells is such that its liquid crystal material does not revert immediately to the grandjean state on cooling from the isotropic liquid state wherein the improvement comprises the cells having a construction such that the liquid crystal material of each cell undergoes, on cooling from the isotropic liquid state, the transition isotropic liquid state to focal conic state, without reverting immediately to the grandjean state.

8 Claims, 2 Drawing Figures

TEMPERATURE INDICATING DEVICES

The present invention relates to temperature indicating devices.

The indication of temperature by devices which include a series of cells containing liquid crystal material is known. The composition of the material in such devices varies from cell to cell in the series. Each material is normally a mixture of compounds which together strongly reflect light of a particular wavelength which depends on temperature so that the cell can indicate temperature by its iridescence in a particular colour.

Each cell in these known devices is normally made by applying cholesteric liquid crystal material, which is dispersed as droplets of about 10 μm diameter in a suitable polymer, either on its own as described in U.S. Pat. No. 3,872,050 or pre-coated in another plastics material as described in U.S. Pat. No. 3,720,623, onto a thin transparent substrate. The substrate has stencilled on it numbers representing temperatures in °C. indicated by the various cells such that the numbers are transparent on a black background. The cells are deposited over the regions of the substrate containing the corresponding numbers. A black reflector is then deposited on top of the liquid crystal cells to exhibit reflections other than those from the liquid crystal when the substrate is viewed from the opposite face. In other words the cells are viewed through the numbers with the black reflector behind them. Formation of the cell in this way ensures that whilst the liquid crystal material is in the temperature range where it is in cholesteric liquid crystal phase it is permanently fixed in the so-called grandjean or planar state or texture, which is a helical molecular arrangement giving strong reflection of light at a particular wavelength. The selective reflection is a Bragg-like reflection, the principal reflected wavelength λ being related to the helical pitch P of the molecular arrangement by the equation:

$$\lambda = nP \qquad \text{Eq. 1}$$

where n is the average refractive index $$\frac{n_o + n_e}{2},$$

($n_o$ = ordinary refractive index $n_e$ = extraordinary refractive index).

The composition of the material of each cell is varied from cell-to-cell so that the selective reflection of a particular reference colour, eg green, occurs at suitable temperature intervals, eg 2° C., along the series of cells. In this way the temperature of the environment adjacent to the cells is given by the cell which has the reference colour.

One disadvantage of these known devices is that whilst one cell in the series selectively reflects one colour other cells are likely to reflect another colour, eg red or blue, according to the spectral reflection properties of the cells as a function of temperature and this can be distracting or confusing to the observer. Consequently, it may be necessary to apply a monochromatic filter to the cells so that the reference colour only is seen.

One purpose of the present invention is to provide a temperature indicating device comprising a series of liquid crystal cells which does not rely on the reflection of a particular colour to indicate temperature.

A liquid crystal temperature sensing device comprising a series of liquid crystal cells which does not rely on the reflection of a particular colour to indicate temperature has been proposed in U.S. Pat. No. 3,440,882. This device makes use of a hysteretic effect which apparently only occurs in certain cholesteryl compounds which are the subject of U.S. Pat. No. 3,529,156.

Cholesteric liquid crystal materials containing these compounds are formed into cells by microencapsulation so that in their liquid crystal phase they are fixed in the so-called grandjean or planar state which is iridescent. When the temperature rises above the clearing point of the liquid crystal materials, which differs from cell-to-cell in the device, the materials become an isotropic liquid and lose their colouration. Unlike other cholesteric materials which are microencapsulated these materials when cooled below the clearing point do not immediately show the strong colouration of the grandjean state once more after cooling below the clearing point. Although the mechanism for the effect is largely unexplained it is believed to be an effect which is unique to the particular materials disclosed.

The disadvantage of the device described in U.S. Pat. No. 3,440,882 is that the cholesteryl compounds on which the device is based are relatively unstable and the device does not have the desired long life, accuracy or reliability required for use in certain important temperature sensing applications, eg as a thermometer.

It is the purpose of the present invention to provide a liquid crystal temperature sensing device which does not rely on the reflection of a particular colour and does not rely on the use of a particular cholesteric material to indicate temperature.

According to the present invention a temperature indicating device comprises a series of liquid crystal cells each of which contains a liquid crystal material having a different composition, the compositions varying from cell-to-cell, and each of which cells exhibits the grandjean (or planar) state whereby temperature is indicated by iridescence of the cells, the cells being such that the liquid crystal material in each has a clearing point at a different selected temperature in a series of temperatures in a temperature range of interest and that each of the cells is such that its liquid crystal material does not revert immediately to the grandjean state on cooling from the isotropic liquid state characterized in that the construction of the cells is such that the liquid crystal material of each cell undergoes, on cooling from the isotropic liquid state, the transition isotropic liquid state to focal conic state, without reverting immediately to the grandjean state.

The term 'clearing point' is a term well known in the liquid crystal art which means the temperature at which a liquid crystal material is converted from a liquid crystal state to an isotropic liquid state.

The terms 'grandjean' or 'planar' state are synonymous terms for the particular state of a chiral liquid crystal material in its liquid crystal mesophase in which the axes of twist in the molecular helical arrangements are essentially aligned parallel to one another.

In contrast to the 'grandjean' or 'planar' state the 'focal conic' state is the state of a chiral liquid crystal material in its liquid crystal mesophase in which the axes of twist in the molecular helical arrangements are essentially random (the molecules being packed into randomly orientated 'focal conic' domains).

It is to be noted that in many cholesteric liquid crystals a "pretransitional phase", the so called blue phase, is formed for about 0.5° C. below the clearing point and that on cooling from this short phase or from the isotropic liquid through this phase the focal conic state is formed.

The device operates as follows. When the temperature of the adjacent environment exceeds the clearing point of the liquid crystal composition of a particular cell that composition is converted to the isotropic liquid state which is colourless or not strongly coloured, ie not iridescent. Other cells in the series having a clearing point greater than the temperature of the adjacent environment appear strongly coloured because of their iridescence in the grandjean state in which they remain. Thus, for instance, some cells in the series can be converted into the isotropic state whilst others are still in the grandjean state. Thus, the temperature of interest is indicated by the number of cells in the series which are still in the grandjean state which are not iridescent, in other words the particular place in the series of cells where the changeover from iridescent to non-iridescent cells occurs.

Consequently one advantage of devices embodying the present invention is that the particular colour of the iridescent cells is unimportant. Thus, external colour filters are unnecessary, although they may be employed if desired. Likewise, the colours reflected by a particular cell at different temperatures are also unimportant, although a colour versus temperature calibration of each cell may be additionally provided for reference by the user if desired.

A further advantage of devices embodying the present invention is that if the temperature falls again those cells which have been converted to the isotropic liquid state do not return to the grandjean state on cooling but are converted instead to the focal conic state. This state is also colourless or only weakly coloured, ie non-iridescent, and thus can also be distinguished from the grandjean state by its lack of a strong selective colour reflection. This means that the device has a memory function because once a cell has been changed from the grandjean state and has lost its iridescence in that state it remains colourless or weakly coloured, ie non-iridescent, irrespective of subsequent temperatures, for a period of time which may be until special steps are subsequently taken to return it to the grandjean state. Thus, devices embodying the invention can be used to record the maximum temperature of an event which may have occurred some time ago.

Because the memory function is provided by the cell construction, which causes the liquid crystal material of each cell to enter the focal conic state on cooling from the isotropic liquid phase, rather than the use of certain materials as in the device of U.S. Pat. No. 3,440,882, the use of unstable materials, as used in the device of that U.S. Patent, may be avoided. In fact the highly stable liquid crystal cyanobiphenyl compounds which are the subject of U.S. Pat. Nos. 3,947,375 and 4,077,260 are preferred for use in the liquid crystal materials in the device according to the present invention so that the device can be long lasting, accurate and reliable.

Furthermore, since the memory function (in the device according to the present invention) is obtained by the formation of the focal conic state, which is a true liquid crystal state, a longer memory is possible and, consequently, the cells may be 're-set' into the grandjean state by the user after a relatively long duration.

The composition of the cells and their change of clearing point from cell-to-cell, which is preferably in uniform steps, eg 1 C.°, depends on the particular application of the device. Examples of application of devices embodying the invention are as follows:
(i) as clinical thermometers, the clearing points varying from cell-to-cell over fractions of a degree in a range of typically 15° C. centered on body temperature, eg 37° C.;
(ii) as thermometers to monitor the temperature of frozen food and to give an indication of any unwanted thawing which might have taken place;
(iii) to monitor the maximum temperature and if necessary heat adsorption of a surface of interest, eg on a moving part or body.

One or more characters or symbols may be provided in front of or behind each cell to indicate the temperature, eg as related to the clearing point of the material of the cell, so that the character(s) or symbol(s), which may be selective in nature, may be seen when the cell is in its non-iridescence state. For example, the cells may be deposited on a common substrate on which numerical values are printed corresponding to the temperatures represented by the various cells, the cells being deposited in the regions where the values are printed, the values being for example clear areas on a dard background on the substrate.

Preferably, the cells in the device are arranged in a spatial sequence, eg a linear or arcuate sequence, with the clearing point of the liquid crystal material increasing from cell-to-cell along the sequence.

Preferably, the liquid crystal composition of the cells comprises a mixture of liquid crystal compounds which together exhibit a chiral, eg a cholesteric or alternatively a chiral smectic C, mesophase, the relative proportions of the compounds in the mixture varying progressively from cell-to-cell so that the clearing points vary progressively. The mixture may be formed in a known way by mixing together the constituent components, heating them into the isotropic liquid state with stirring and allowing them to cool.

The compositions may be formed by mixing together two optically active materials in varying proportions, the two materials preferably containing different concentrations of an optically active compound contained in the materials (the actual concentrations depending on the molecular helical pitch of the compound), so that the materials selectively reflect light of the same colour in the grandjean state at a temperature below their clearing point, but have different clearing points. The two materials should mix together homogeneously to form mixtures whose clearing point varies linearly with temperature throughout the mixture composition phase diagram and which selectively reflect light of the same colour.

Preferably, the compositions comprise:
(i) an optically active liquid crystal compound;
(ii) a nematic liquid crystal material, comprising one or more compounds, which is liquid crystalline at room temperature (20° C.) preferably including the racemic isomer of (i);
(iii) a liquid crystal material comprising at least one compound having a high clearing point (above 100° C.), preferably a nematic material;
the proportions by weight of (i) being varied in equal steps from cell-to-cell to give the required steps in clearing point.

The composition will comprise typically 20-80% by weight of (i), 20-80% by weight of (ii) and 5 to 25% by weight of (iii).

Preferably, the optically active compound is CB 15, ie

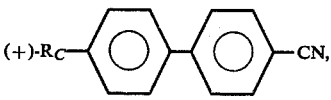

and the racemic isomer is (±)CB15, ie

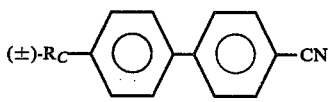

where $R_C$=2-methylbutyl and the signs indicate the optical rotation angles of the compounds. Preferably, the nematic material which is liquid crystalline at room temperature comprises one or more other cyanobiphenyls, particularly K15, ie 4-n-pentyl-4'-cyanobiphenyl.

It will be readily apparent to those skilled in the field of liquid crystal materials that given a suitable mixture undergoing an appropriate transition, eg cholesteric to isotropic liquid, in a temperature region of interest, the components of the mixture can be blended together in appropriate proportions to tailor the clearing point to that required in each cell. It may be appropriate to do this by carrying out a preliminary plot of the variation of this clearing point with composition of the mixture before making compositions at selected intervals, ie places on the plot, for the various cells.

Cells may be constructed so that their liquid crystal material does not revert immediately to the grandjean state when they are cooled from the isotropic liquid state by ensuring in one of a number of known ways that the surface interactions between the liquid crystal material and its container or encapsulant are not sufficiently strong to favour the grandjean state. One known way of achieving this is to enclose a layer of the material having a uniform thickness, eg between 10 μm and 100 μm, between substrates or slides (one of which is transparent) coated on their inner surfaces with an aligning polymer, eg polyvinyl alcohol. One of the polymer coatings may be unidirectionally rubbed, eg with tissue paper, before enclosure of the liquid crystal material, to facilitate alignment of the molecular helices in the grandjean state. The substrates may be of glass or plastics, for example.

It should be stressed that microencapsulation as used in U.S. Pat. No. 3,440,882, cannot be used because that does not allow the focal conic state to form. It fixes the material in the grandjean state whilst in its liquid crystal phase.

Cells which have been converted to the focal conic state may be returned by the user to the grandjean state by the application of a mechanical or electrical shock treatment. For example, if the liquid crystal material is contained between slides, eg glass slides, as mentioned above, the material may be returned to the grandjean state by the application of finger pressure to the slides by the user to compress the material. Alternatively, each cell may contain electrodes, eg transparent conductors, deposited in a known way as in electro-optic liquid crystal devices, which may be connected to an electrical source to facilitate electrical conversion to the grandjean state.

In the prior art devices described above the cell construction is such that the surface interaction forces between the liquid crystal material and its encapsulant favour only the grandjean state when the liquid crystal material is in its liquid crystal mesophase.

Thus if the material is heated into the isotropic state and then cooled again into its liquid crystal mesophase, the focal conic state is encountered only momentarily and is not normally detectable. In contrast, in the cells of devices embodying the present invention the focal conic state is encountered for a significant period of time which may be several minutes, hours, days or even years depending on the particular cell construction and the particular liquid crystal material. Eventually, however, the cells will revert naturally to the grandjean state without external, eg shock treatment.

Embodiments of the present invention will now be described by way of example with reference to the accompanying drawings, in which.

Figure 1:
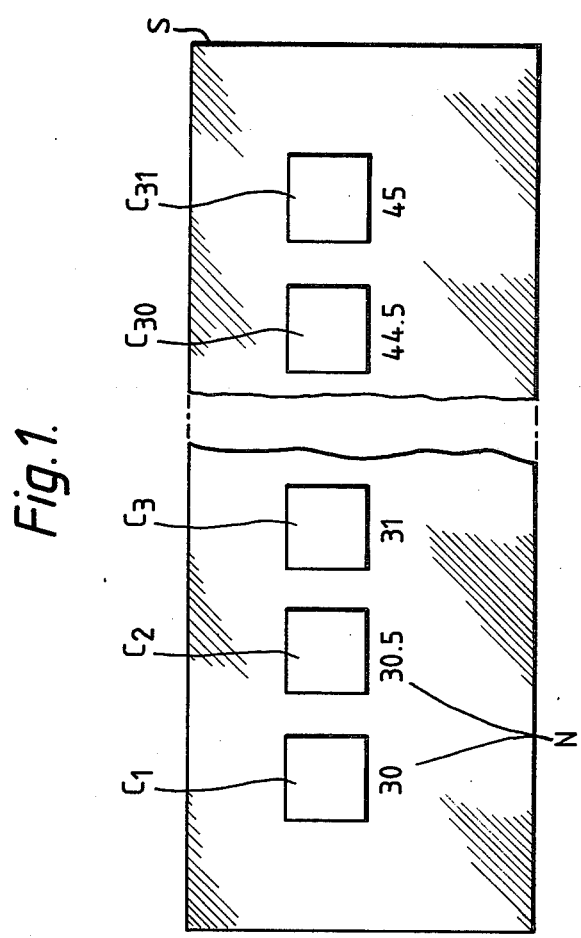
FIG. 1 is a plan view of (portions of) a clinical thermometer.

The clinical thermometer shown in FIG. 1 comprises a transparent strip S of plastics or glass, preferably blackened with a surface coating of Aquadog (Trade Mark) or Ebonide (Trade Mark), having deposited thereon a series of thirty one liquid crystal cells $C_1$, $C_2$ ... $C_{31}$; these cells each comprise a film of cholesteric liquid crystal material sandwiched between two transparent slides, eg of glass or plastics material, the lower one being affixed to the strip S. Each cell is constructed in such a way that its liquid crystal material can be in the grandjean state, but does not revert immediately to the grandjean state, when cooled below the clearing point from the isotropic liquid phase. For example one of the liquid crystal compositions disclosed below may be used in a PVA aligned cell, ie between glass or plastics substrates having a coating of polyvinyl alcohol one of which is unidirectionally rubbed with a soft tissue as is well known to those skilled in the art, the distance between the substrates being ≃30 μm.

An encapsulant cover not shown eg of Sylgard 182 (Trade Mark) may be deposited over the cells $C_1$ etc and the strip S.

The composition of the liquid crystal material contained in the cells $C_1$ ... $C_{31}$ varies progressively from cell to cell so that the clearing point increases in a stepwise fashion from cell-to-cell along the series. In fact, the cell $C_1$ has a clearing point of 30° C., the cell $C_2$ has a clearing point of 30.5° C., the cell $C_3$ has a clearing point of 31° C., and so on, giving steps of 0.5° C. up to 45° C. which is the clearing point of the cell $C_{31}$. The clearing point of each cell is indicated by a numeral N printed on the strip S beneath the corresponding cell.

The composition of each cell $C_1$ ... $C_{31}$ reflects the same colour, eg blue, in the grandjean state. Thus if all of the cells are reset to the grandjean state (by one of the methods described above) before use all of the cells will show the same colour. The body temperature of a subject is taken by placing the thermometer in contact with an appropriate part of the subject's anatomy for a sufficient period for the cells $C_1$ etc to be heated to the subject's body temperature. Some of the cells $C_1$ etc will be heated above their clearing point and will lose their colour whilst others will remain coloured. For example if the subject's body temperature is 37.2° C. then all cells along the series having a clearing point below this temperature, ie cells $C_1$ to $C_{17}$ will lose their colour. All other cells, ie cells $C_{18}$ to $C_{31}$ will remain coloured. This indicates that the temperature of the subject is between 37.0° C. and 37.5° C. The colour loss of cells $C_1$ to $C_{17}$ remains even when the thermometer is removed from the subject causing the temperature to fall.

The liquid crystal materials used in the cells $C_1$ to $C_{31}$ may be provided as follows:

The following material A is a cholesteric liquid crystal material having a composition:

| Compound | Percentage by weight in A |
|---|---|
| CB15 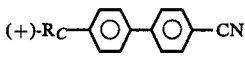 | 50 |
| (±)CB15 = (±)-R$_C$— 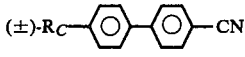 —CN | 27 |
| K15 = n-C$_5$H$_{11}$— 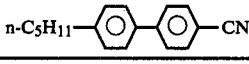 —CN | 23 | where $R_C$=2-methylbutyl, (+) indicates an optically active compound having a positive optical rotation angle and (±) indicates a racemic compound.

The following material B is another cholesteric liquid crystal material having a composition:

| Constituent Material | Percentage by weight in B |
|---|---|
| CB15 | 46 |
| E43 | 45 |
| n-C$_5$H$_{11}$— 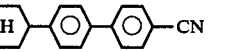 —CN | 9 | where

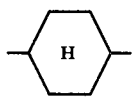

is a trans-1,4 disubstituted cyclohexane ring.

The material E43 is a commercially available nematic mixture, containing cyanobiphenyls plus a high clearing point additive, which is supplied by BDH Chemicals Ltd, Broom Road, Poole, Dorset, as are the compounds CB15 and K15.

Figure 2:
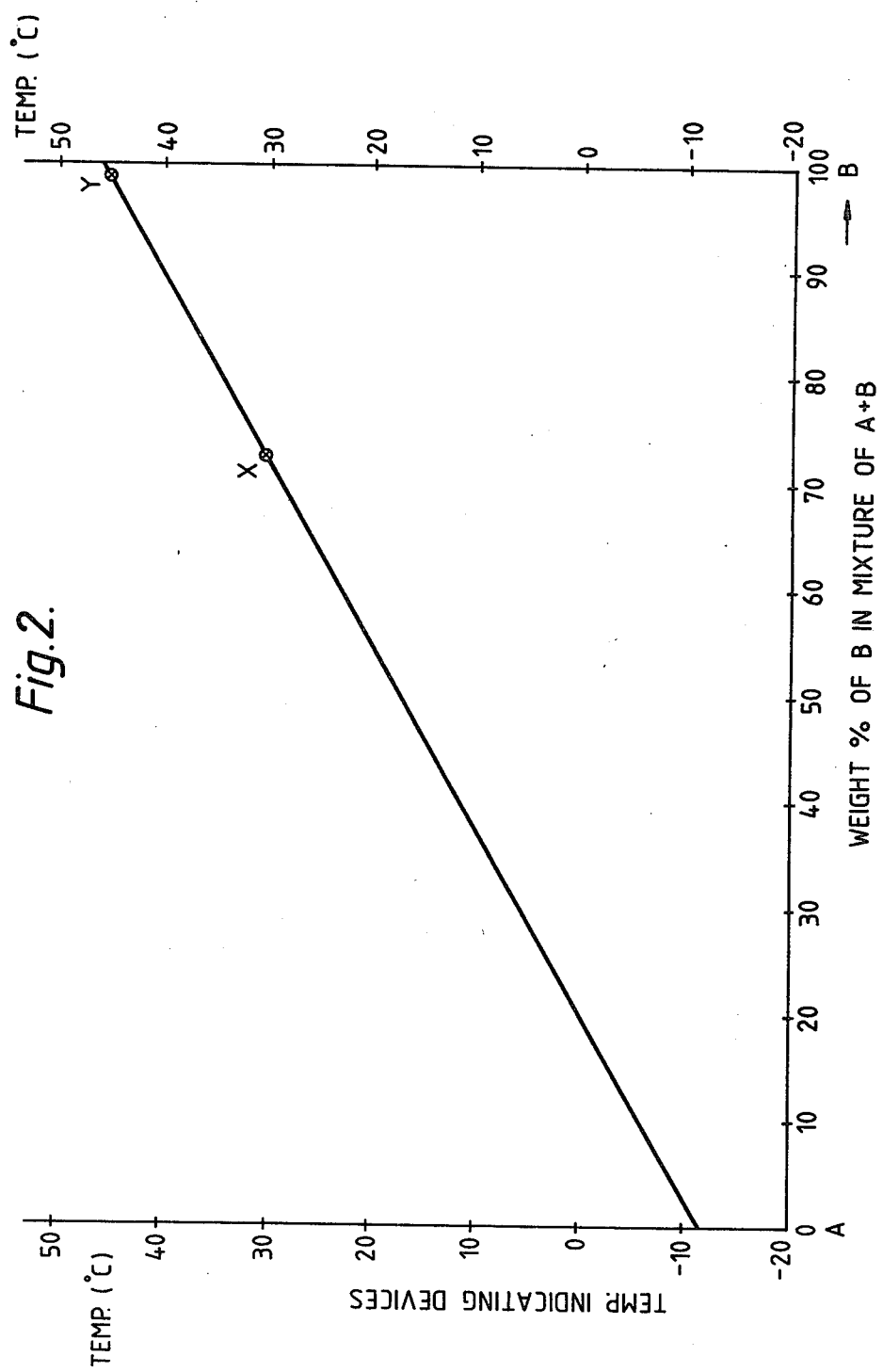
FIG. 2 is a liquid crystal composition phase diagram consisting of a graph of temperature plotted against mixture composition for mixtures of materials A and B as defined below.

Materials A and B and mixtures of them give blue selective reflection in the grandjean state. FIG. 2 shows the variation of clearing point of mixtures of material A plus material B as the composition of such mixtures changes. It will be seen that the variation is linear, extending from −11.3° C. for 100% A to +45° C. for 100% B.

Compositions for the cells $C_1 \ldots C_{31}$ in the thermometer shown in FIG. 1 are obtained by taking 31 equally spaced points (ie in 30 steps) along the plot from a point corresponding to a composition X to a point corresponding to a composition Y (these two limiting points only being shown in FIG. 2). In fact, the composition X is 72.5% by weight of B (with 27.5% by weight of A) and the composition Y is 98.5% by weight of B (with 1.5% by weight of A) so that the change in composition from cell-to-cell is by a step of 0.867% by weight of B. Thus, cell $C_1$ contains 72.50% B, cell $C_2$ contains 73.37% B, cell $C_3$ contains 74.13% B and so on up to cell $C_{31}$ which contains 98.5% B.

The colour of the cells $C_1$ to $C_{31}$ in the grandjean state can be adjusted as necessary (eg changed to red) by adding a further quantity of the racemate ie(±)CB15 to the mixture of A+B. The frequency of the light selectively reflected varies linearly with the weight of (±)CB15 added so that the colour achieved can be predetermined by providing a preliminary plot of frequency v weight of (±)CB15 added.

For greater accuracy gradations of less than 0.5° C. along the temperature scale may be obtained by having smaller changes in liquid crystal composition from cell-to-cell. The gradations need not be in fractions of a degree C; they may be in fractions of a degree F the composition changes being selected accordingly.

In an alternative thermometer (not shown) the temperature indicating numerals may be printed on the substrate behind the cells, the numerals being in the form of clear areas on a black background (as in prior art devices).

A black reflector is deposited over the cells and the rest of the substrate so that when this black reflector is viewed via the opposite face of the substrate the cells are only clearly seen when they are in the grandjean ie iridescent state when whey appear as coloured numerals. In the focal conic state the cells (if the liquid crystal layer is sufficiently thin eg less than 30 μm) are transparent so only black will be seen.

An efficient thermal conductor is preferably provided on the substrates in the thermometers described above. This may be gold black used for the black reflector or it may include an additional conducting layer, eg of copper (not shown). In either case the entire thermometer may be encapsulated inside an outer transparent casing.

The liquid crystal thermometer described above may, like any other liquid crystal thermometer, be mounted on a thermal insulator (not shown) such that it may be used, by suitable calibration of the temperature gradient across the insulator, to measure the temperatures of surfaces which are much greater than the clearing point ranges of the materials comprising the thermometer.

We claim:

1. A temperature indicating device comprising a series of liquid crystal cells each being free of cholesteryl compounds and containing (1) a cyanobiphenyl compound having the formula

where $R_c$ is (+)-2-methylbutyl, (2) a nematic liquid crystal material which is liquid crystalline at room temperature (20° C.) including a compound of the formula

where $R_c$ is (±)-2-methyl butyl and (3) a liquid crystal material having a clearing point above 100° C., said cyanobiphenyl compounds being present in different concentrations in different cells whereby said cyanobiphenyl compounds selectively reflect light of the same color in the grandjean state at temperatures below their respective temperature clearing points, but have different clearing points varying stepwise from cell-to-cell to indicate temperature by iridescence of the cells, each cell undergoing, on cooling from the isotropic liquid state, the transition isotropic liquid state to focal conic state, without reverting immediately to the grandjean state.

2. A device as claimed in claim 1 and wherein said liquid crystal material has a layer with an average thickness of between 10 μm and 100 μm, contained between substrates at least one of which is transparent, the substrates being coated on their inner surfaces with an aligning polymer.

3. A device as claimed in claim 2 and wherein the average thickness of the layer of liquid crystal material in each cell is 30 μm.

4. A device as claimed in claim 1 and wherein the concentration of the said three components in the material of each cell is as follows:
 (i) from 20% to 80% by weight of (1);
 (ii) from 20% to 80% by weight of (2);
 (iii) from 5% to 25% by weight of (3).

5. A device as claimed in claim 1 and wherein the device is a clinical thermometer, the cells having clearing points in a range which includes the temperature 37° C.

6. A device as claimed in claim 1 and wherein each cell includes a character or symbol, relating to the clearing point of the material of the cell, which can be seen when the material of the cell is not in its grandjean state.

7. A device as claimed in claim 6 and wherein the cells are deposited on a common substrate on which numerical values are printed corresponding to the temperatures represented by the cells, the cells being deposited where the values are printed.

8. A device as claimed in claim 7 and wherein the numerical values are in the form of clear areas on a dark background on the substrate.

* * * * *